United States Patent [19]
Klusmier

[11] 3,822,022
[45] July 2, 1974

[54] CLAMP MEANS FOR MATERIAL HANDLING APPARATUS

[75] Inventor: Kenneth L. Klusmier, Worcester, Mass.

[73] Assignee: Morgan Construction Company, Worcester, Mass.

[22] Filed: Jan. 26, 1973

[21] Appl. No.: 326,699

[52] U.S. Cl. ............................................. 214/1 R
[51] Int. Cl. ............................................ B65g 61/00
[58] Field of Search .......... 214/1 P, 1 PZ, 1 R, 6.5, 214/6 N, 8.5 C, 8.5 P, 8.5 R

[56] References Cited
UNITED STATES PATENTS
3,729,190  4/1973  Harris et al. ................. 271/68 X
FOREIGN PATENTS OR APPLICATIONS
969,527  9/1964  Great Britain .................. 214/6 H Primary Examiner—Frank E. Werner
Attorney, Agent, or Firm—Chittick, Thompson & Pfund

[57] ABSTRACT

For use with an apparatus for handling elongated elements wherein the elements are initially arranged in a horizontal tier on spaced support members overlying a receiving device such as for example a vertically adjustable elevator, and wherein the support members are subsequently retracted from beneath the elements to deposit the latter on the receiving device, the improvement which comprises a clamp mechanism located at one end of the receiving device, said clamp mechanism being movable from an open inoperative position remote from the ends of the elements being handled to a closed operative position gripping the ends of the elements to thereby prevent the elements from turning or flipping about their longitudinal axes as they drop from the support members onto the receiving device.

5 Claims, 6 Drawing Figures

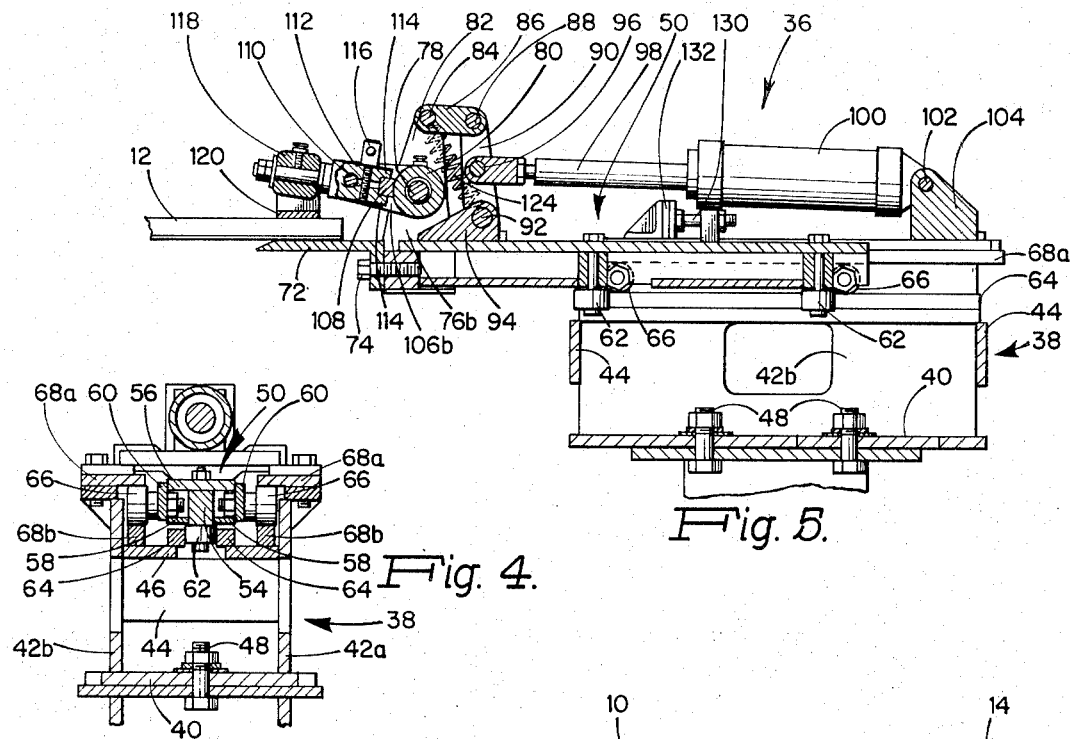
Fig. 5.
Fig. 4.
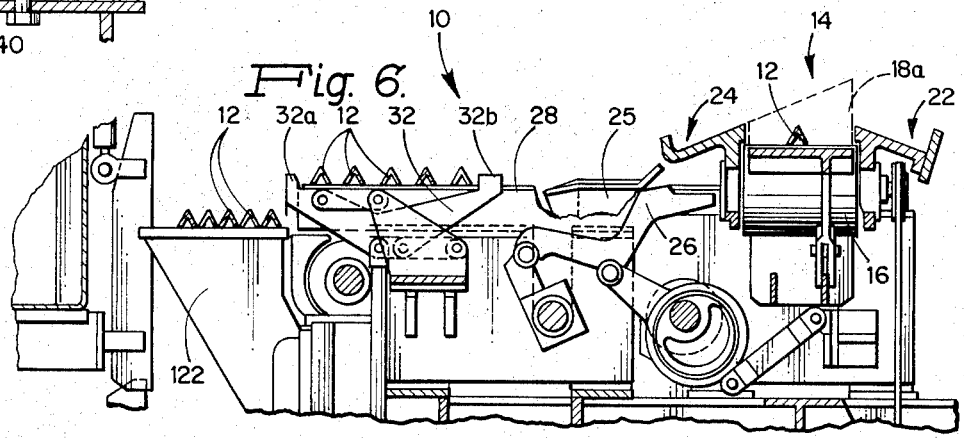
Fig. 6.
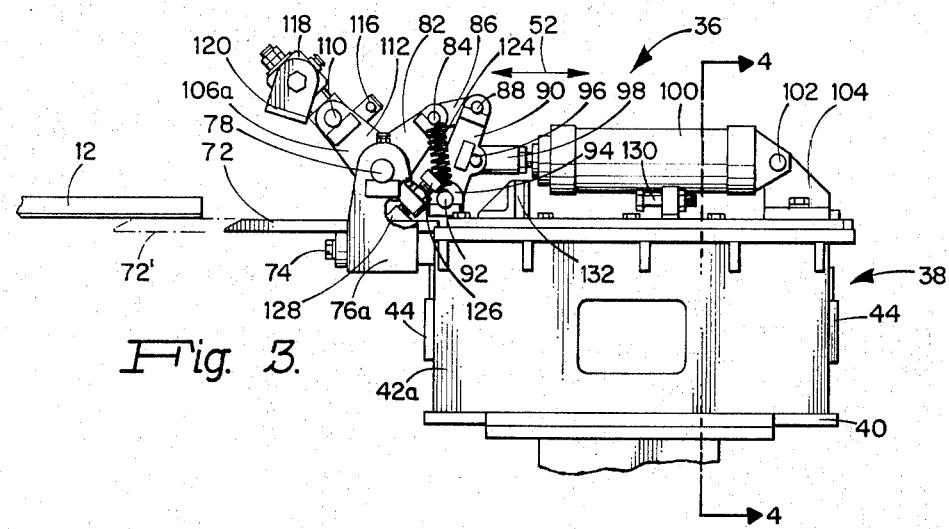
Fig. 3.

3,822,022

CLAMP MEANS FOR MATERIAL HANDLING APPARATUS

DESCRIPTION OF THE INVENTION

This invention relates generally to the art of material handling, and is particularly concerned with a novel and improved clamp mechanism for use with an apparatus employed to handle elongated elements such as for example angles, channels and the like.

An object of the present invention is the provision of a means for preventing such elongated elements from turning or flipping about their longitudinal axes as they are being stripped from support skids and allowed to drop onto an underlying receiving means. To this end, the invention provides a clamp mechanism at one end of the receiving means. The clamp mechanism is advanced from an open inoperative position remote from the ends of the elements being handled to a closed operative position gripping the ends of the elements prior to the retraction of the supporting skids. By gripping the ends of the elements in this manner, they are prevented from turning or flipping about their longitudinal axes and are thus deposited on the receiving means in the desired manner. This is particularly important when handling elements such as angles or channels where each successive tier being deposited must be uniformly arranged.

Another object of the present invention is the provision of a clamp device which is movable between an open inoperative position remote from the ends of the elements being handled, and an operative closed position gripping the ends of said elements, the said motion being imparted by a single double-acting piston-cylinder unit operating through a novel linkage arrangement. A further object of the present invention is the provision of a clamp device which is rugged in construction and simple to operate, thereby minimizing maintenance and control requirements.

These and other objects and advantages of the present invention will become more apparent as the description proceeds with the aid of the accompanying drawings wherein:

FIG. 3 is a view in side elevation of the clamp device;

FIG. 4 is a sectional view taken along lines 4—4 of FIG. 3;

FIG. 5 is a sectional view taken along lines 5—5 of FIG. 2, but showing the clamp device in its closed operative position gripping the ends of the elongated elements; and, FIG. 6 is a sectional view taken along lines 6—6 of FIG. 1.

Figure 1:
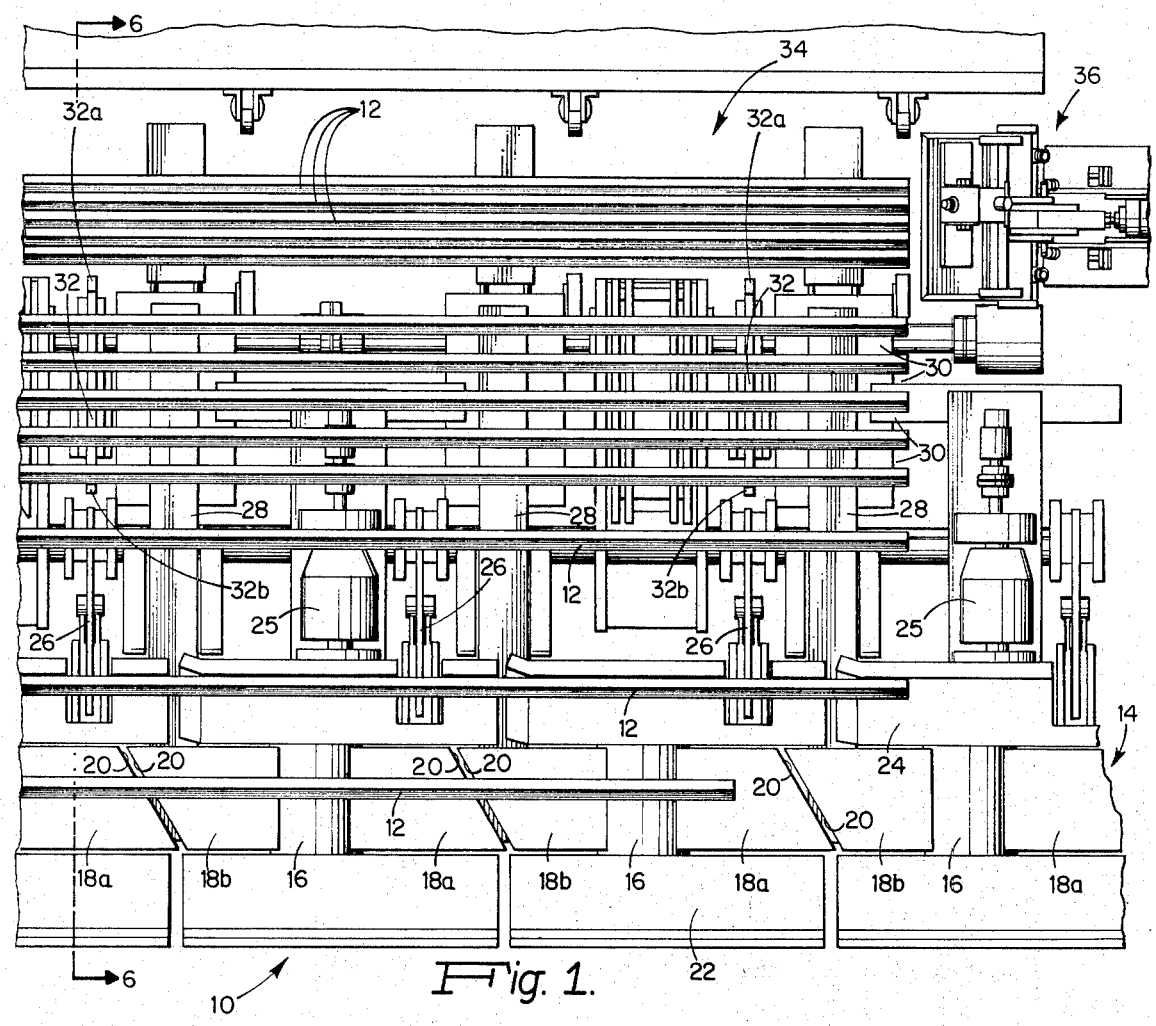
FIG. 1 is a partial plan view of a clamp device in accordance with the present invention shown in conjunction with an apparatus for handling elongated elements.

Referring initially to FIGS. 1 and 6, there is generally indicated at 10 an apparatus for handling elongated elements. This apparatus is described in detail in U.S. application, Ser. No. 164,601 filed on July 21, 1971 and assigned to the same assigneee as that of the present application.

The apparatus 10 receives elongated elements (herein indicated typically as angles 12) along a roller table generally indicated at 14. The roller table has driven rollers 16, with intermediate pivotally mounted apron plates 18a and 18b positioned therebetween. Each apron plate has a diagonally extending inner edge 20. By pivotally raising apron plates 18b, an elongated element 12 on roller table 14, which for some reason is not acceptable, will be shifted laterally into a "reject notch" 22 for subsequent removal. Acceptable elongated elements will be shifted into another notch 24 on the opposite side of the roller table 14 by pivotally raising apron plates 18a.

"Picker arms" 26 are then employed to transfer each of the elongated elements 12 from notch 24 onto alignment rollers 25, from where the elements are laterally shifted onto spaced support members 28 (hereinafter called "skids") which are axially extended after each element is deposited thereon, thereby creating a space 30 between each element.

After a predetermined number of elements has been deposited on the skids 28, say for example five, laterally spaced stop members 32 are then raised from an inoperative position beneath the skids 28 to an operative position as shown in FIG. 6. The stop members are each provided with front and rear upwardly extending fingers 32a and 32b which protrude above the skids when the stop members are operatively positioned. After the stop members are raised, the skids 28 are retracted to "pack" the elements previously deposited thereon against the rear fingers 32b. This produces a tightly packed tier.

The stop members 32 are then dropped and another group of elements is deposited on the skids. Thereafter, the stop members 32 are raised again and the skids are retracted. When this occurs, the second group of laterally spaced elements is again packed against the rear fingers 32b, while the previously packed first group of elements (generally indicated at 34) is stripped off of the skids by the front fingers 32a on the stop members 32. As previously indicated, this apparatus and its mode of operation is described in detail in U.S. application, Ser. No. 164,601.

The present invention is directed to a clamp device generally indicated at 36 for preventing the elongated elements 12 from turning or flipping about their longitudinal axes as they are being stripped from the support skids 28. The clamp device 36 will now be described in more detailed with additional reference to FIGS. 2-5.

The clamp device 36 includes a fixed base or pedestal generally indicated at 38 which is comprised basically of a bottom plate 40, side plates 42a and 42b, cross braces 44, and a horizontal intermediate plate 46 spaced above the bottom plate 40. The base 38 may be fixed in place by any convenient means, for example, bolts 48.

A carriage assembly generally indicated at 50 is mounted on the base 38 for movement in opposite directions as indicated diagrammatically in FIG. 3 by the arrow 52. As is best shown in FIG. 4, the carriage assembly 50 includes a center beam 54 which together with a top plate 56, laterally extending bottom plates 58 and side plates 60, forms a rigid structure. Lower guide wheels 62 run between track members 64 affixed to the intermediate plate 46. Similarly, laterally extending guide wheels 66 run between track members 68a and 68b also fixed relative to the base 38.

The carriage assembly 50 has a lower horizontally extending clamp shoe 72 affixed to the forward end thereof by any convenient means such as for example machine screws 74. Upstanding brackets 76a and 76b also are affixed to the forward end of the carriage assembly 50. The brackets 76a and 76b support an axle 78 which in turn rotatably supports a tubular member 80, the latter having radially extending laterally spaced ears 82 which are pivotally connected by means of a horizontally extending pin 84 to an intermediate link 86. The link 86 is in turn pivotally connected at its other end as at 88 to the upper ends of laterally spaced links 90. The lower ends of the links 90 are pivotally connected by means of another pin 92 to upstanding brackets 94 affixed to carriage assembly 50. The links 90 are further pivotally connected as at 96 to the piston rod 98 of an operating cylinder 100, the latter being pivotally connected at its rearward end as at 102 to an upstanding bracket 104 which is fixed to the rear end of the base 38.

The tubular member 80 is further provided adjacent its opposite ends with radially extending arms 106a and 106b, and with a flange 108 which extends longitudinally along the length thereof. The arms 106a and 106b support a shaft 110 which is laterally spaced from and parallel to the flange 108.

The shaft 110 extends through an arm 112 having laterally spaced ears 114 (see FIG. 5) straddling the flange 108 on tubular member 80. A hand-adjustable bolt 116 is threaded through the ears 114. When the bolt 116 is loosened, the arm 112 may be slid along the lengths of the shaft 110 and flange 108. Tightening of the bolt 116 causes the ears 114 to frictionally squeeze the flange 108 therebetween, thereby fixing the arm 112 in place.

A head 118 is affixed to the opposite end of the arm 112. The head 118 supports an upper clamp shoe 120 which is adapted to cooperate in a manner to be hereinafter described with the lower clamp shoe 72.

As shown in FIG. 3, the clamp device 36 is in its retracted inoperative position, with the upper clamp shoe 120 raised to its open position, and with the carriage assembly 50 retracted to locate the upper and lower clamp shoes 120, 72 at positions laterally remote from the ends of elongated elements 12 supported on the skids 28 at a position overlying elevator platforms 122. A pair of spring 124 extend between pins 84 and 92 and exert a clockwise torque on the ears 82, causing adjustable stops 126 on the tubular member 80 to contact fixed stops 128 on the carriage assembly 50.

After the skids 28 hae been extended to position a tightly packed tier of elements 12 over the elevator platform 122, and the stop members 32 have been raised, and prior to the retraction of the skids 28 from beneath the elements 12 against the holding action of the front fingers 32a, the clamp device is actuated in the following manner; hydraulic fluid is fed into the cylinder 100 to cause the piston rod 98 to be extended. This in turn causes the carriage assembly 50 to move to the left as viewed in the drawings until adjustable stops 130 on the carriage assembly contact fixed stops 132 on the base 38. During this initial movement, which causes the lower clamp shoe 72 to move to the position indicated in dotted at 72' in FIG. 3, the restraining action of the springs 124 prevents any counterclockwise rotation of the tubular member 80 about axle 78, and thus holds the upper clamp shoe 120 in its raised position. As soon as the adjustable stops 130 on the carriage assembly come into contact with the fixed stops 132 on the base 38, further extension of the piston rod 98 will overcome the restraining force of the springs 124. When this occurs, further extension of the piston rod will act through links 90 and 86 on the ears 82 to rotate the tubular member 80 in a counterclockwise direction about the axle 78. When this occurs, the upper clamp shoe 120 will be rotated downwardly to cooperate with the lower clamp shoe 72 in clamping the elongated elements 12 therebetween. This condition is illustrated in FIG. 5.

Figure 2:
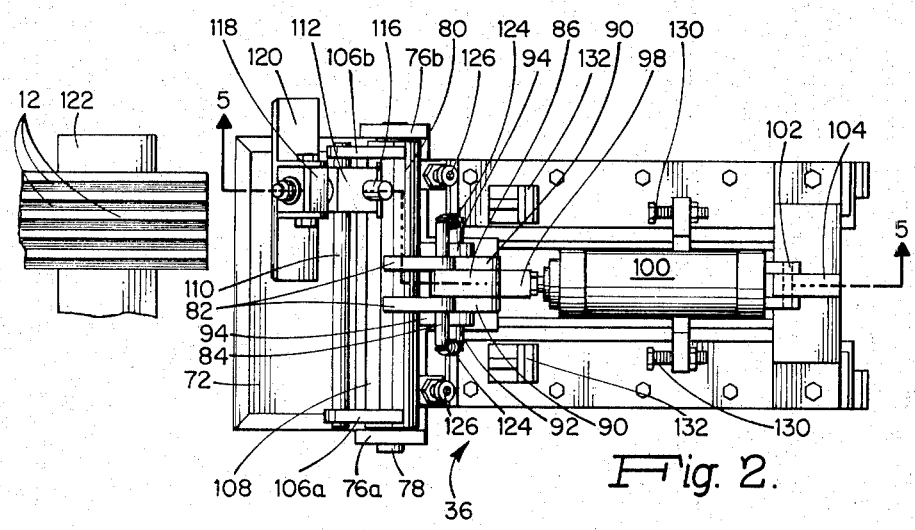
FIG. 2 is another plan view on an enlarged scale of the clamp device shown in FIG. 1.

With the clamp device 36 thus adjusted to its operative position, the skids 28 are then retracted from beneath the elongated elements 12, resulting in the latter being dropped downwardly onto the underlying elevator platforms 122. At this is occurring, the clamping action exerted by the upper and lower clamp shoes 120 and 72 will prevent the elongated elements from twisting or flipping about their longitudinal axis as the skids 28 are being retracted. After the skids have been fully retracted, the clamp device 36 will be returned to its retracted inoperative position as shown in FIGS. 1–3. As the lower clamp shoe 72 is retracted, the ends of the elongated elements previously supported thereby will drop onto the underlying elevator platform.

In light of the foregoing, it will now be more evident to those skilled in the art that the present invention provides a novel and improved clamp device 36 for preventing elongated elements from turning or flipping about their longitudinal axis. This is accomplished by exerting a clamping action on the ends of the elements as they are being dropped from the support skids 28 onto the underlying elevator platforms 122. The clamp device includes a minimum of moving parts, and only requires a single operating cylinder 100. The upper clamp shoe 120 is adjustable laterally in relation to the lower clamp shoe 72 in order to provide a means of centering the upper shoe on the tier being handled, thereby insuring that a more uniform pressure is exerted on each element in the tier.

It is my intention to cover all changes and modifications of the embodiment herein chosen for purposes of disclosure which do not depart from the spirit and scope of the invention.

I claim:

1. For use with an apparatus for handling elongated elements wherein the elements are initially arranged in a horizontal tier on spaced support members overlying a receiving means, and wherein the support members are subsequently retracted from beneath the elements to deposit the latter on the receiving means, the improvement comprising: carriage means located at one end of said receiving means, clamp means mounted on said carriage means, and operating means including a single piston-cylinder unit connected through intermediate pivotal linkage means to both said carriage means and said clamp means, said operating means being operative to move said carriage means between a retracted position at which said clamp means is open and remote from the ends of the elements, and an advanced position at which said clamp means is closed and gripping the ends of the elements to thereby prevent the elements from turning or flipping about their longitudinal axes during retraction of the support members.

2. The apparatus as claimed in claim 1 wherein said clamp means includes a lower clamp shoe and an upper clamp shoe movable vertically relative to said lower clamp shoe to grip the ends of elements located therebetween.

3. The apparatus as claimed in claim 2 wherein said lower clamp shoe is provided with a width greater than that of said upper clamp shoe, and wherein said upper clamp shoe is adjustable laterally in relation to said lower clamp shoe.

4. The apparatus as claimed in claim 1 wherein said upper clamp shoe is carried by bell crank means pivotally mounted on said carriage means.

5. For use with an apparatus for handling elongated elements wherein the elements are initially arranged side-by-side in a horizontal tier on laterally spaced supports which overlie a receiving means, and wherein the supports are then retracted from beneath the elements to deposit the latter on the receiving means, the improvement comprising: carriage means located at one end of said receiving means, clamp means carried by said carriage means, said clamp means including a lower clamp shoe affixed to said carrriage means, and an upper clamp shoe movable relative to said lower clamp shoe, said upper clamp shoe being carried by bell crank means pivotally attached to said carriage means, and operating means including a piston-cylinder unit which is pivotally connected at one end to a fixed support and at the other end through intermediate linkage means to both said carriage assembly and said bell crank means, whereupon extension and retraction of said piston-cylinder unit will result in said clamp means being moved between an operative closed position at which the ends of the elements are gripped between said upper and lower clamp shoes, and an inoperative open position at which said lower clamp shoe is displaced laterally from the ends of the elements.

* * * * *